(12) United States Patent
Takata (10) Patent No.: US 11,077,824 B2
(45) Date of Patent: Aug. 3, 2021

(54) VEHICLE THEFT PREVENTION DEVICE

(71) Applicant: AISIN SEIKI KABUSHIKI KAISHA, Kariya (JP)

(72) Inventor: Yosuke Takata, Nagoya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 169 days.

(21) Appl. No.: 16/383,730

(22) Filed: Apr. 15, 2019

(65) Prior Publication Data

US 2019/0344750 A1 Nov. 14, 2019

(30) Foreign Application Priority Data

May 11, 2018 (JP) ............................. JP2018-092320

(51) Int. Cl.

| B60R 25/01 | (2013.01) |
| G05D 1/02 | (2020.01) |
| B60N 2/02 | (2006.01) |
| B60N 2/14 | (2006.01) |
| E05B 81/72 | (2014.01) |
| E05B 81/70 | (2014.01) |

(52) U.S. Cl.
CPC ............ B60R 25/01 (2013.01); B60N 2/0244 (2013.01); B60N 2/14 (2013.01); G05D 1/0212 (2013.01); E05B 81/70 (2013.01); E05B 81/72 (2013.01)

(58) Field of Classification Search
CPC ...................................................... B60R 25/01
See application file for complete search history.

(56) References Cited

U.S. PATENT DOCUMENTS

| 8,334,760 B2 | 12/2012 | Tanaka et al. | |
| 2007/0228793 A1* | 10/2007 | Chao | B60N 2/02 |
| | | | 297/353 |
| 2012/0316704 A1* | 12/2012 | Ohbayashi | B60R 25/04 |
| | | | 701/2 |

FOREIGN PATENT DOCUMENTS

| JP | 2004-231000 | 8/2004 |
| JP | 2009-023448 | 2/2009 |
| JP | 2009269476 | * 11/2009 |
| JP | 2010-208400 | 9/2010 |
| JP | 2014-073727 | 4/2014 |

OTHER PUBLICATIONS

JP2009269476 machine translation (Year: 2009).*
JP2014073727 machine translation (Year: 2014).*

* cited by examiner

*Primary Examiner* — Anne Marie Antonucci
*Assistant Examiner* — Abdalla A Khaled
(74) *Attorney, Agent, or Firm* — Oblon, McClelland, Maier & Neustadt, L.L.P.

(57) ABSTRACT

A vehicle theft prevention device includes: a device control unit that starts, when performing exit processing for causing a vehicle to move from a parking position to a user position by an autonomous driving control of the vehicle in response to an exit instruction to the vehicle from a terminal of the user outside the vehicle, performing first change processing for changing a state of facilities in a vehicle cabin of the vehicle from a theft prevention state in which theft of the vehicle and articles in the vehicle cabin is prevented to a normal state in which the vehicle is able to be driven by the user such that the first change processing ends when the vehicle arrives at the user position.

4 Claims, 7 Drawing Sheets

VEHICLE THEFT PREVENTION DEVICE

CROSS REFERENCE TO RELATED APPLICATIONS

This application is based on and claims priority under 35 U.S.C. § 119 to Japanese Patent Application 2018-092320, filed on May 11, 2018, the entire contents of which are incorporated herein by reference.

TECHNICAL FIELD

An embodiment of the present disclosure relates to a vehicle theft prevention device.

BACKGROUND DISCUSSION

A technology has been developed, in which a vehicle theft can be prevented by making it difficult to drive the vehicle by narrowing a gap between a driver's seat and a steering wheel of the parked vehicle. In addition, a technology has been developed in which, when an occupant of the vehicle passes through a fixed facility installed at the entrance or the like, by returning the seat of the vehicle and the steering wheel from a theft prevention position to prevent the vehicle theft to a normal position where the vehicle can be driven, both the prevention of the vehicle theft and a smooth entry into the vehicle can be achieved.

JP 2004-231000A and JP 2014-073727A are examples of the related art.

However, in the technology of narrowing the gap between the driver's seat and the steering wheel of the parked vehicle in order to prevent the vehicle theft, security under circumstances such as an automatic valet parking is not taken into consideration, and since the purpose of the technology is to make a state difficult to drive the vehicle, the security against the theft of articles inside the vehicle cabin is not taken into consideration.

The technology in which the seat of the vehicle and the steering wheel are returned to the normal position from the theft prevention position when the occupant of the vehicle passes through a fixed facility also does not take the security under the circumstances such as the automatic valet parking into consideration, and it is needed to determine whether or not the occupant has passed through the fixed facility. Therefore, the place where above-described technology can be applied is restricted and the security for the theft of the facilities in the vehicle cabin is not taken into consideration.

SUMMARY

A vehicle theft prevention device in an embodiment includes a device control unit as an example. The device control unit starts, when performing exit processing for causing a vehicle to move from a parking position to a user position by an autonomous driving control of the vehicle in response to an exit instruction to the vehicle from a terminal of the user outside the vehicle, performing first change processing for changing a state of facilities in a vehicle cabin of the vehicle from a theft prevention state in which theft of the vehicle and articles in the vehicle cabin is prevented to a normal state in which the vehicle can be driven by the user ends such that the first change processing when the vehicle arrives at the user position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments of the present invention will be disclosed below. Configurations in the embodiment described below, as well as the actions, results, and effects come from the configurations are just examples. The present invention can be realized by a configuration other than the configuration disclosed in the following embodiments, and it is possible to obtain at least one effect from various effects based on the basic configurations and effects derived therefrom.

The vehicle on which a vehicle theft prevention device according to the present embodiment is mounted may be an automobile (an internal combustion engine automobile) using an internal combustion engine (an engine) as a driving source, may be an automobile (an electric automobile, a fuel cell automobile, and the like) using an electric motor (a motor) as a driving source, or may be an automobile (a hybrid automobile) using both of them as a drive source. Furthermore, the vehicle can be equipped with various transmission devices, and various devices (systems, parts, or the like) necessary for driving the internal combustion engines and the electric motors. In addition, a type, the number, a layout, and the like of the devices relating to the driving of the wheels of the vehicle can be set variously.

Figure 1:
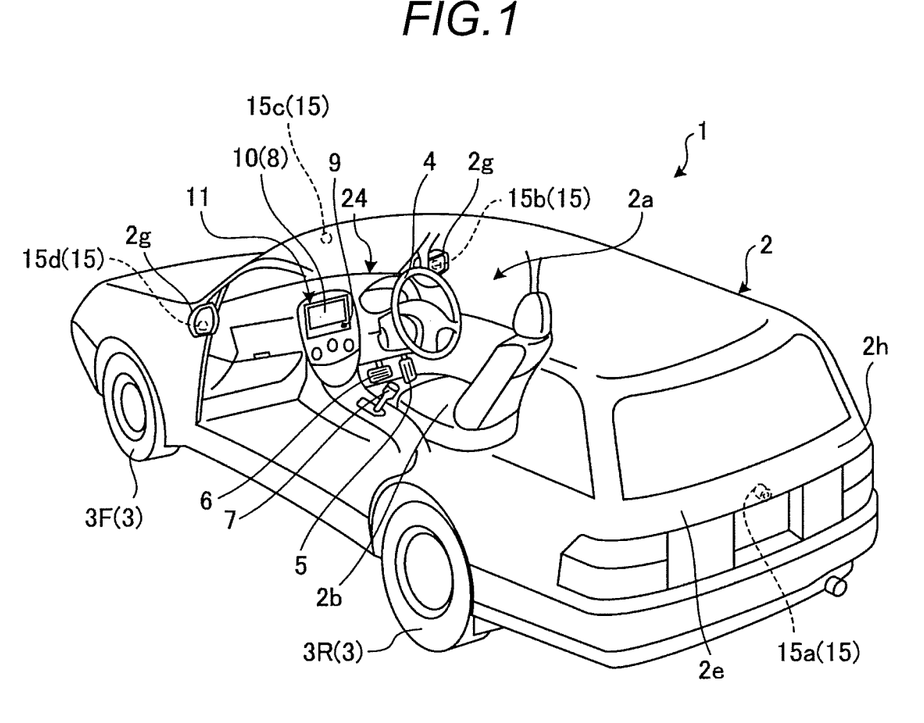
FIG. 1 is a perspective view of an example of a state in which a part of a vehicle cabin of a vehicle equipped with a vehicle theft prevention device according to a present embodiment is projected.
Figure 2:
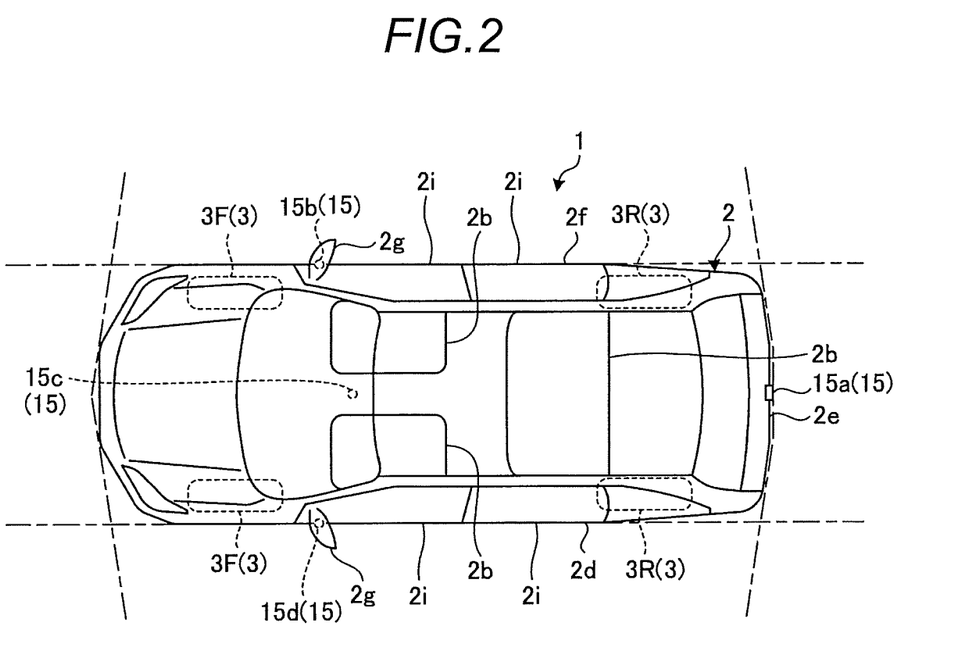
FIG. 2 is a plan view of an example of the vehicle according to the present embodiment.

FIG. 1 is a perspective view of an example of a state in which a part of a vehicle cabin of a vehicle equipped with a vehicle theft prevention device according to the present embodiment is projected. FIG. 2 is a plan view of an example of the vehicle according to the present embodiment. As illustrated in FIG. 1, the vehicle 1 includes a vehicle body 2, a steering section 4, an acceleration operation section 5, a braking operation section 6, a shift operation section 7, and a monitor device 11. The vehicle body 2 includes a vehicle cabin 2a in which occupants rides, doors 2i (side doors) and a rear hatch door 2h for the occupants to get into the vehicle cabin 2a. In the vehicle cabin 2a, a plurality of seats 2b on which the occupants are seated are provided. In addition, in the vehicle cabin 2a, the steering section 4, the acceleration operation section 5, the braking operation section 6, the shift operation section 7, and the like are provided in such a state that the driver as an occupant faces the seat 2b (driver's seat). The steering section 4 is, for example, a steering wheel protruding from a dashboard 24. The acceleration operation section 5 is, for example, an accelerator pedal provided under a foot of the driver. The braking operation section 6 is, for example, a brake pedal provided under the foot of the driver. The shift operation section 7 is, for example, a shift lever protruding from a center console.

The monitor device 11 is provided, for example, at the center of the dashboard 24 in the vehicle width direction (that is, the left-right direction). For example, the monitor device 11 may have a function of a navigation system or an audio system. The monitor device 11 includes a display device 8, a voice output device 9, and an operation input section 10. The monitor device 11 may also include various operation input sections such as switches, dials, joysticks, and pushbuttons.

The display device 8 is configured with a liquid crystal display (LCD), an organic electroluminescent display (OELD) and the like, and can display various images based on image data. The voice output device 9 is configured with a speaker or the like, and outputs various voices based on the voice data. The voice output device 9 may be provided at a different position in the vehicle cabin 2a other than the monitor device 11.

The operation input section 10 is configured with a touch panel or the like, and enables the occupant to input various information. The operation input section 10 is provided on a display screen of the display device 8 and is capable of projecting the image displayed on the display device 8. As a result, the operation input section 10 makes it possible for the occupant to visually recognize the image displayed on the display screen of the display device 8. The operation input section 10 receives the input of various information by the occupant by detecting the touch operation of the occupant on the display screen of the display device 8.

As illustrated in FIG. 1 and FIG. 2, the vehicle 1 is a four-wheeled automobile or the like, and has two of right and left front wheels 3F and two of right and left rear wheels 3R. All or a part of the four wheels 3 can be steered.

The vehicle 1 is equipped with a plurality of imaging units 15. In the present embodiment, for example, the vehicle 1 is equipped with four imaging units 15a to 15d. The imaging unit 15 is a digital camera having an imaging device such as a charge coupled device (CCD) or a CMOS image sensor (CIS). The imaging unit 15 is capable of imaging the surroundings of the vehicle 1 at a predetermined frame rate. The imaging unit 15 outputs the captured images obtained by imaging the surroundings of the vehicle 1. The imaging unit 15 includes a wide-angle lens or a fisheye lens, and is capable of imaging a range of, for example, 140° to 220° in the horizontal direction. Furthermore, in some cases, the optical axis of the imaging unit 15 may be set obliquely downward.

Specifically, the imaging unit 15a is provided, for example, on a lower wall portion of a rear window of a rear hatch door 2h in a rear end portion 2e of the vehicle body 2. The imaging unit 15a is capable of imaging the area behind the vehicle 1 in the surroundings of the vehicle 1. The imaging unit 15b is provided, for example, on the right side door mirror 2g in the right side end portion 2f of the vehicle body 2. The imaging unit 15b is capable of imaging the area on the sides of the vehicle 1 in the surroundings of the vehicle 1. The imaging unit 15c is provided, for example, on the back side of the inner mirror in the vehicle cabin 2a in the front side of the vehicle body 2. The imaging unit 15c is capable of imaging the area in front of the vehicle 1 in the surroundings of the vehicle 1. The imaging unit 15d is provided, for example, on the left side of the vehicle body 2, that is, on the left side door mirror 2g in the left side end portion 2d in the vehicle width direction. The imaging unit 15d is capable of imaging the area on the sides of the vehicle 1 in the surroundings of the vehicle 1.

Figure 3:
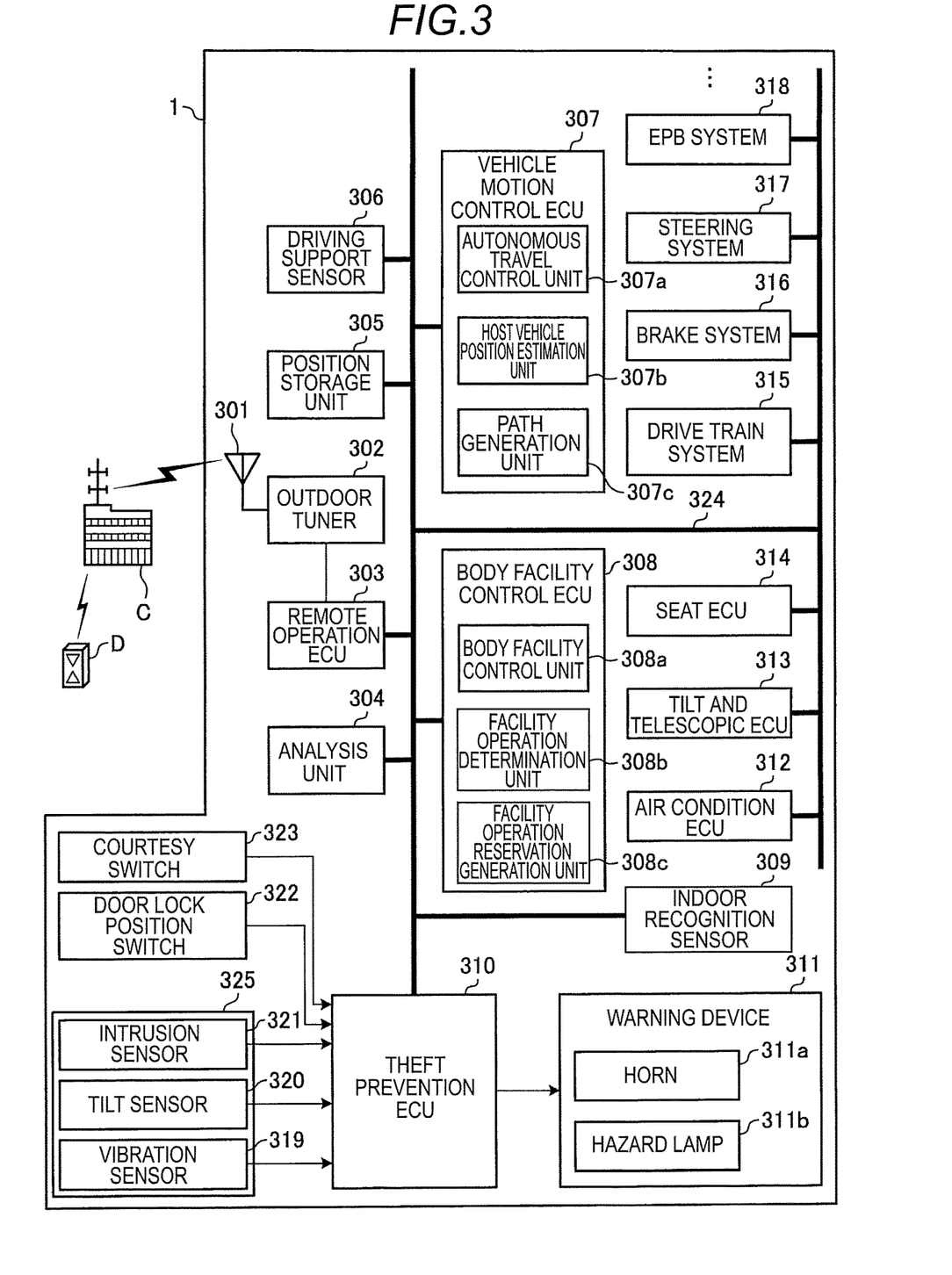
FIG. 3 is a block diagram illustrating an example of a functional configuration of the vehicle according to the present embodiment.

FIG. 3 is a block diagram illustrating an example of the functional configuration of the vehicle according to the present embodiment. As illustrated in FIG. 3, the vehicle 1 includes an antenna 301, an outdoor tuner 302, a remote operation electronic control unit (ECU) 303, an analysis unit 304, a position storage unit 305, a driving support sensor 306, a vehicle motion control ECU 307, a body facility control ECU 308, an indoor recognition sensor 309, a theft prevention ECU 310, a warning device 311, an air condition ECU 312, a tilt and telescopic ECU 313, a seat ECU 314, a drive train system 315, a brake system 316, a steering system 317, an electronic parking brake (EPB) system 318, a vibration sensor 319, a tilt sensor 320, an intrusion sensor 321, a door lock position switch 322, a courtesy switch 323, and the like.

The remote operation ECU 303, the analysis unit 304, the position storage unit 305, the driving support sensor 306, the vehicle motion control ECU 307, the body facility control ECU 308, the indoor recognition sensor 309, the theft prevention ECU 310, the air condition ECU 312, the tilt and telescopic ECU 313, the seat ECU 314, the drive train system 315, the brake system 316, the steering system 317, and the EPB system 318 are electrically connected via an in-vehicle network 324 which is a telecommunication line. The in-vehicle network 324 is configured by a controller area network (CAN) or the like.

The antenna 301 makes it possible to communicate with a management device C installed in a center that manages a parking lot where the vehicle 1 can park or a control tower. In addition, the antenna 301 receives various kinds of radio wave signals relating to starting of a driving source (for example, an engine, electric motor) of the vehicle 1, a control of an on-vehicle devices and air conditioning device mounted on the vehicle 1, from various external devices D which are terminals of users such as a smart key and a smartphone. The outdoor tuner 302 selects a radio wave to be received by the antenna 301.

The remote operation ECU 303 periodically transmits a request signal to the management device C or the external device D via the antenna 301 and the outdoor tuner 302. The remote operation ECU 303 receives an answer signal (authentication information) such as a remote operation request or smart key information from the management device C or the external device D via the antenna 301 and the outdoor tuner 302. In accordance with the received answer signal such as the remote operation request and the smart key information, the remote operation ECU 303 transmits various requests relating to the control of the vehicle 1 (for example, an operation request for instructing the start of operation of the vehicle 1 and a stop request for requesting the stop of operation of the vehicle 1) to each unit of the vehicle motion control ECU 307, the body facility control ECU 308, the theft prevention ECU 310, the air condition ECU 312, the tilt and telescopic ECU 313, the seat ECU 314, the drive train system 315, the brake system 316, the steering system 317, the EPB system 318, and the like. Here, the remote operation request is information requesting the remote operation of the vehicle 1. The smart key information is information received from a smart key near the vehicle 1 (for example, a smart key existing within a distance set in advance from the vehicle 1), and is information that makes it possible to identify the smart key.

The analysis unit 304 performs a diagnosis of the vehicle 1 and transmits a result of diagnosis to the remote operation ECU 303. In the present embodiment, when an abnormality of the vehicle 1 is detected by the diagnosis of the vehicle 1, the analysis unit 304 transmits a stop request to each unit of the vehicle 1 from the remote operation ECU 303 to stop the operation of the vehicle 1.

The position storage unit 305 stores map information indicating a map around the vehicle 1. The driving support sensor 306 detects an obstacle or the like existing around the vehicle 1 and transmits the surroundings information indicating the result of detection to the vehicle motion control ECU 307.

The indoor recognition sensor 309 detects the presence or absence of the occupants or articles in the vehicle cabin 2a and transmits the result of detection to the theft prevention ECU 310. The indoor recognition sensor 309 is, for example, a load weight sensor, a rear seat occupancy sensor, an imaging unit for driver monitoring, an imaging unit for occupant monitoring, a three-dimensional object sensor, a radio wave type sensor, or the like. The load weight sensor is provided on the side portion of the front passenger's seat in the seat 2b and measures a load weight applied to the front passenger's seat. The rear seat occupancy sensor is provided inside the rear seat of the seat 2b and measures a load weight applied to the rear seat. The imaging unit for driver monitoring is provided in the vicinity of a steering column in the vehicle cabin 2a and is capable of imaging the occupant seated on the driver's seat of the seat 2b. The imaging unit for occupant monitoring is provided in the vicinity of an overhead console in the vehicle cabin 2a and is capable of imaging all the occupants in the vehicle cabin 2a. The three-dimensional object sensor is provided in the vicinity of the overhead console in the vehicle cabin 2a (or on the driver's seat and the back of the headrest of the front passenger's seat or on the roof portion of the vehicle cabin 2a), and can detect the three-dimensional shape of the three-dimensional object existing in the vehicle cabin 2a. The radio wave type sensor is provided in the vicinity of the steering column in the vehicle cabin 2a and is capable of detecting reflected waves such as ultrasonic waves and infrared rays reflected by a three-dimensional object in the vehicle cabin 2a.

The vehicle motion control ECU 307 controls devices (hereinafter referred to as "travel devices") that manages the traveling of the vehicle 1 such as the drive train system 315, the brake system 316, the steering system 317, the EPB system 318, and then, performs a control of an autonomous travel (autonomous driving) of the vehicle 1 without the operation by the occupant (hereinafter, referred to as an autonomous driving control). In the present embodiment, the vehicle motion control ECU 307 includes an autonomous travel control unit 307a, a host vehicle position estimation unit 307b, and a path generation unit 307c.

In response to an exit instruction of the vehicle 1 from the external device D owned by the user outside of the vehicle 1 for taking the vehicle 1 out, the autonomous travel control unit 307a performs the exit processing (so-called an automatic valet parking) for taking the vehicle 1 out from the parking position and moving the vehicle 1 to a user position (hereinafter, referred to as a user position) using the autonomous driving control of the vehicle 1. In addition, in response to a parking instruction of the vehicle 1 from the external device D owned by the user outside of the vehicle 1 for parking the vehicle 1, the autonomous travel control unit 307a performs parking processing (so-called an automatic valet parking) for moving the vehicle 1 into the parking position and the vehicle 1 is parked in the parking position by the autonomous driving control of the vehicle 1. In the present embodiment, the autonomous travel control unit 307a performs the exit processing and the parking processing according to a path generated by the path generation unit 307c to be described later.

The host vehicle position estimation unit 307b estimates a current position of the vehicle 1 (hereinafter, referred to as a host vehicle position) on the map indicated by the map information stored in the position storage unit 305 when the vehicle 1 is moved by the exit processing or the parking processing by the autonomous travel control unit 307a.

When the exit processing or the parking processing is performed by the autonomous travel control unit 307a, the path generation unit 307c generates the path of the vehicle 1 from the host vehicle position to the user position (or parking position) based on the estimated host vehicle position and the map indicated by the map information stored in the position storage unit 305. Furthermore, when the exit processing is performed by the autonomous travel control unit 307a, the path generation unit 307c calculates an arrival time of the vehicle 1 at the user position based on the generated path.

The body facility control ECU 308 outputs an operation instruction to the seat ECU 314 and the tilt and telescopic ECU 313 to control the state of various facilities (hereinafter, referred to as body facilities) such as the seat 2b (seat) and the steering section 4 provided in the vehicle cabin 2a. In the present embodiment, the body facility control ECU 308 includes a body facility control unit 308a, a facility operation determination unit 308b, and a facility operation reservation generation unit 308c.

When the exit processing is performed by the vehicle motion control ECU 307, the body facility control unit 308a performs first change processing for changing the state of the body facilities from a theft prevention state to a normal state. Here, the normal state is a state in which the vehicle 1 can be driven by the user among the states in which the state of the body facilities can be changed. The theft prevention state is a state in which the theft of the vehicle 1 and the articles in the vehicle cabin 2a can be prevented among the states in which the state of the body facilities can be changed. When the first change processing is performed, the body facility control unit 308a starts performing the first change processing such that the state of the body facility returns from the theft prevention state to the normal state when the vehicle 1 arrives at the destination. In other words, the body facility control unit 308a controls a timing of starting the performance of the first change processing such that the first change processing ends when the vehicle 1 arrives at the destination.

In this way, when getting out the vehicle 1 from the parking position and moving the vehicle 1 to the user position by the autonomous driving control, a time during which the body facility is the normal state can be shortened. Therefore, it is possible to reduce the possibility that the vehicle 1 and the articles in the vehicle cabin 2a may be stolen by an illegal act against the vehicle 1 during a time the vehicle 1 arrives at the user position from the parking position, and the user can get on the vehicle 1 smoothly. In addition, when the vehicle 1 is taken out from the parking position and arrives at the user position, the body facilities return to the state in which the vehicle 1 can be driven. The security against the theft of the vehicle 1 and the articles in the vehicle cabin 2a can be assured, and it is possible to get into the vehicle 1 without a waiting time.

In addition, when the parking processing is performed by the vehicle motion control ECU 307, the body facility control unit 308a performs a second change processing for changing the state of body facilities from the normal state to the theft prevention state. At that time, the body facility control unit 308a starts the performing of the second change processing after the vehicle 1 is separated from the external device D by a predetermined distance or more. Here, the predetermined distance is a distance set in advance, and is, for example, an upper limit distance at which the external device D such as the smart key owned by the user of the vehicle 1 can directly communicate with the vehicle 1. In this way, when the vehicle 1 is moved to the parking position by the autonomous driving control, and is parked in the parking position, the second change processing is performed after the possibility that the user returns to the vehicle 1 becomes low. Therefore, when the occupant temporarily returns to the vehicle 1 to take a forgotten object or the like in the vehicle cabin 2a after the parking instruction is transmitted from the external device D, it is possible to prevent the situation in which it is difficult for the occupant to return to the vehicle cabin 2a due to the state of the body facilities being changed to the theft prevention state.

The facility operation determination unit 308b detects a state of the body facility. When the vehicle motion control ECU 307 performs the exit processing, the facility operation reservation generation unit 308c obtains a processing time required for the first change processing based on the state of the body facility detected by the facility operation determination unit 308b. Then, the facility operation reservation generation unit 308c instructs the body facility control unit 308a to start to perform the first change processing at a time back from the arrival time calculated by the vehicle motion control ECU 307 as much as the processing time. However, if the first change processing is not completed before the vehicle 1 arrives at the user position because the distance between the user position and the host vehicle position is short, the facility operation reservation generation unit 308c may instruct to start the first change processing at the same time as the exit processing.

The seat ECU 314 controls a state of the seat 2b (for example, the position in the front-rear direction and the tilt of a backrest of the seat 2b) according to the instruction from the body facility control unit 308a. In the present embodiment, the seat ECU 314 changes the state of the seat 2b from theft prevention state to the normal state when the first change processing is performed. On the other hand, the seat ECU 314 changes the state of seat 2b from the normal state to the theft prevention state when the second change processing is performed. Here, the theft prevention state of the seat means a state in which the seat 2b is changed (for example, moved) to a state it is difficult to enter the vehicle cabin 2a and to steal the articles in the vehicle cabin 2a.

The tilt and telescopic ECU 313 controls a state of the steering section 4 (for example, the position of the steering section 4 in the front-rear direction and the height of the steering section 4) according to the instruction from the body facility control unit 308a. In the present embodiment, the tilt and telescopic ECU 313 changes the state of steering section 4 from the theft prevention state to the normal state when the first change processing is performed. On the other hand, the tilt and telescopic ECU 313 changes the state of the steering section 4 from the normal state to the theft prevention state when the second change processing is performed.

The air condition ECU 312 controls an operation of the air conditioning device provided in the vehicle 1 in response to an operation request or a stop request from the remote operation ECU 303. The drive train system 315 controls the drive train of the vehicle 1 according to a traveling instruction output from the vehicle motion control ECU 307. The brake system 316 controls the braking of the vehicle 1 according to the traveling instruction output from the vehicle motion control ECU 307. The steering system 317 controls the steering of the steering section 4 according to a traveling instruction output from the vehicle motion control ECU 307. The EPB system 318 controls the EPB of the vehicle 1 according to the traveling instruction output from the vehicle motion control ECU 307.

The courtesy switch 323 is provided on the doors 2h and 2i of the vehicle 1 and is a sensor for detecting the opening and closing of the doors 2h and 2i, and notifies the theft prevention ECU 310 of the detection result of the opening and closing of the doors 2h and 2i. The door lock position switch 322 is provided on a door lock of the vehicle 1 and detects whether the door lock is locked or the door lock is released, and then, notifies the theft prevention ECU 310 of the detection result.

The intrusion sensor 321 detects an illegal intrusion to the vehicle cabin 2a based on the detection results by the ultrasonic waves and radio waves reflected into the vehicle cabin 2a. The tilt sensor 320 detects an inclination of the vehicle 1, and detects an illegal act against the vehicle 1 based on the detection result. The vibration sensor 319 detects a vibration of the vehicle 1, and detects an illegal act against the vehicle 1 based on the detection result. In the description hereafter, when it is not necessary to distinguish the intrusion sensor 321, the tilt sensor 320, and the vibration sensor 319 from each other, they may be referred to as a fraud detection sensor 325.

The theft prevention ECU 310 performs processing for preventing the theft of the vehicle 1 and the objects in the vehicle cabin 2a. In the present embodiment, the theft prevention ECU 310 detects the illegal act against the vehicle 1 using the courtesy switch 323, the door lock position switch 322, the intrusion sensor 321, the tilt sensor 320, and the vibration sensor 319 according to the state of the vehicle 1.

Here, the state of vehicle 1 includes a no-warning state, a warning preparation state, a warning state, and an alarm state. The no-warning state is a state in which the occupant intends to get on the vehicle 1. The warning preparation state is a state in which the occupant intends to get off the vehicle 1. The warning state is a state in which the occupant has no intention to get on the vehicle 1, and the occupant has gotten off the vehicle 1. The alarm state is a state in which an illegal act against the vehicle 1 is detected, and a warning is issued from the warning device 311.

In the present embodiment, when it is determined that the vehicle 1 is in the warning state and the vehicle 1 is operated according to the remote operation request received by the remote operation ECU 303, the theft prevention ECU 310 disables the fraud detection sensor 325 or decreases a detection sensitivity of the fraud detection sensor 325, and detects the illegal act against the vehicle 1 using the indoor recognition sensor 309. In this way, when it is determined that the vehicle 1 is in the warning state and the vehicle 1 is operated in accordance with remote operation request, an erroneous detection of the illegal act against the vehicle 1 by fraud detection sensor 325 can be prevented and the illegal act against the vehicle 1 can be detected using the indoor recognition sensor 309. Therefore, even when it is determined that the vehicle 1 is in the warning state and the vehicle 1 is operated according to the remote operation request, it is possible to prevent the possibility of the erroneous detection of the illegal act against the vehicle 1 by the fraud detection sensor 325, and thus, it is possible to detect the illegal act against the vehicle 1 with high accuracy.

Here, disabling the fraud detection sensor 325 means that the fraud detection sensor 325 does not detect the illegal act against the vehicle 1. In addition, decreasing the detection sensitivity of the fraud detection sensor 325 means decreasing the sensitivity of detecting the illegal act against the vehicle 1 by the fraud detection sensor 325. For example, when the illegal act against the vehicle 1 is detected using the tilt sensor 320, the theft prevention ECU 310 increases the threshold value of the inclination of the vehicle 1 for determining whether the illegal act against the vehicle 1 has occurred or not, or decreases an output intensity of the tilt sensor 320 (in other words, decreases the inclination of vehicle 1 to be detected by the tilt sensor 320). In addition, when the illegal act against the vehicle 1 is detected using the vibration sensor 319, the theft prevention ECU 310 increases the threshold value of the magnitude of the vibration of the vehicle 1 for determining whether the illegal act against the vehicle 1 has occurred or not, or decreases the output intensity of the vibration sensor 319 (in other words, decreases the vibration magnitude of the vehicle 1 to be detected by the vibration sensor 319).

In the present embodiment, it is assumed that, if it determined that the vehicle 1 is in the warning state and the vehicle 1 is operated according to the remote operation request, the theft prevention ECU 310 detects the illegal act against the vehicle 1 using the indoor recognition sensor 309. In this way, when it is determined that the vehicle 1 is in the warning state and the vehicle 1 is operated according to the remote operation request, it is possible to improve the accuracy of detecting the illegal act against the vehicle 1 without providing a new sensor for detecting the illegal act other than the fraud detection sensor 325. As a result, when it is determined that the vehicle 1 is in the warning state and the vehicle 1 is operated according to the remote operation request, it is possible to appropriately prevent the theft of the vehicle 1 and the accessories in the vehicle 1 while suppressing the increase of the cost for adding the new sensor.

In addition, if it is determined that the vehicle 1 is in the warning state and the remote operation request is not received from the external device D, the theft prevention ECU 310 enables the fraud detection sensor 325. At that time, the theft prevention ECU 310 disables the indoor recognition sensor 309. In this way, when it is determined that the vehicle 1 is in the warning state and the remote operation request is not received, since the illegal act against the vehicle 1 is detected using only the fraud detection sensor 325, it is possible to reduce the processing load on the indoor recognition sensor 309 for detecting the illegal act against the vehicle 1. Here, disabling the indoor recognition sensor 309 means to make a state in which the indoor recognition sensor 309 does not detect the illegal act against the vehicle 1. In addition, enabling the fraud detection sensor 325 means to make a state in which the fraud detection sensor 325 can detect the illegal act against the vehicle 1, and means that the detection sensitivity of the fraud detection sensor 325 is returned to the detection sensitivity set in advance when the detection sensitivity of the fraud detection sensor 325 is decreased below a detection sensitivity set in advance.

When the illegal act against the vehicle 1 is detected, the warning device 311 gives a notification of the occurrence of the illegal act against the vehicle 1 to the outside. In the present embodiment, when the illegal act against the vehicle 1 is detected, the warning device 311 gives a notification of the occurrence of the illegal act against the vehicle 1 to the outside by sounding the horn 311*a* included in the vehicle 1 or turning on the hazard lamp 311*b* included in the vehicle 1. Alternatively, when the illegal act against the vehicle 1 is detected, the warning device 311 may notify the external device D of the fact that the illegal act against the vehicle 1 has been detected, via the antenna 301.

In the present embodiment, the vehicle motion control ECU 307, the body facility control ECU 308, and the theft prevention ECU 310 are provided in the vehicle 1, but the present invention is not limited thereto, and all or a part of the vehicle motion control ECU 307, the body facility control ECU 308, and the theft prevention ECU 310 may be provided in the management device C (for example, a cloud, a control tower infrastructure).

Figure 4:
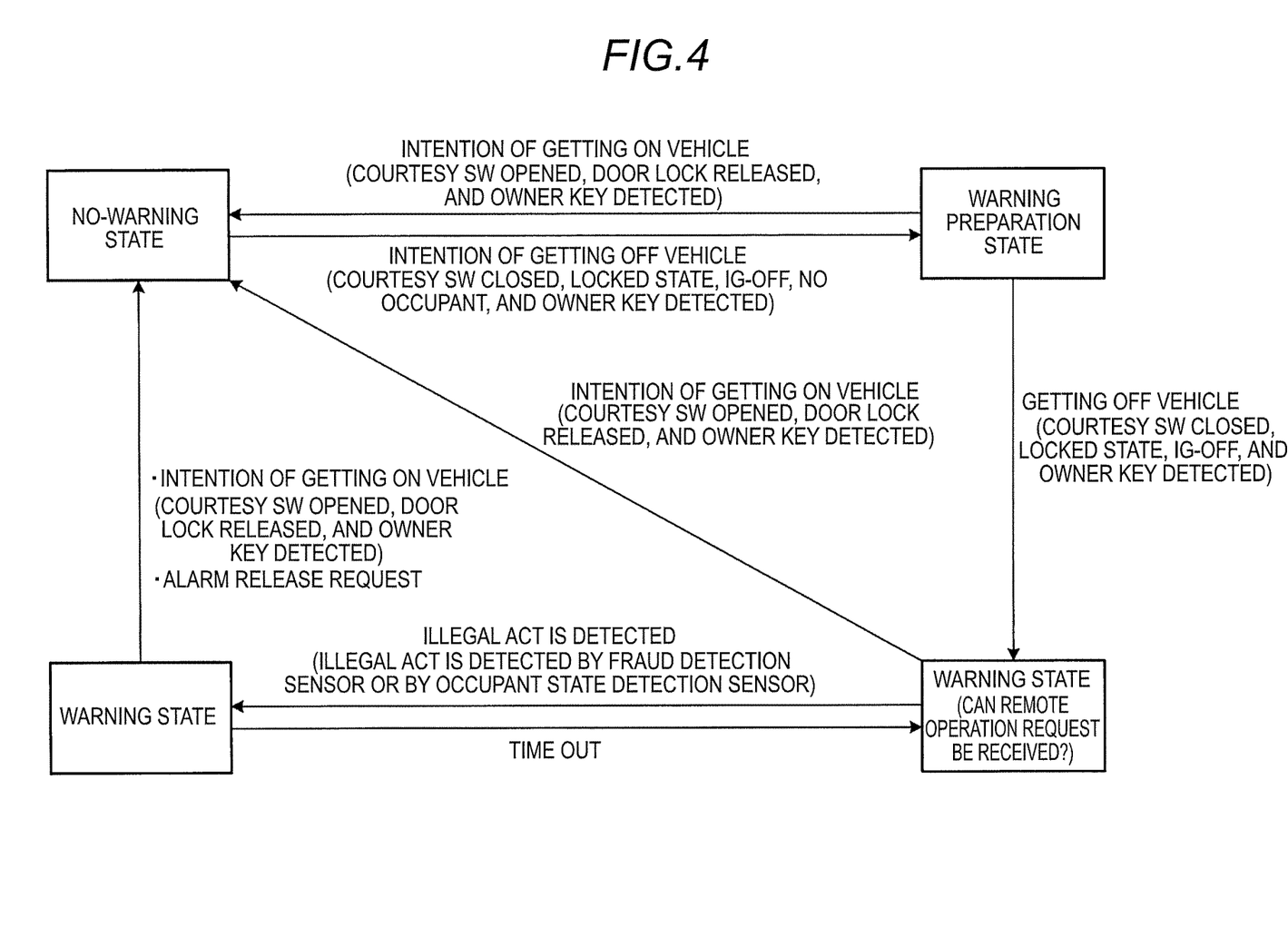
FIG. 4 is a diagram for explaining an example of a state transition of the vehicle according to the present embodiment.

Next, an example of a state transition of the vehicle 1 according to the present embodiment will be described with reference to FIG. 4. FIG. 4 is a diagram for explaining an example of the state transition of the vehicle according to the present embodiment.

As illustrated in FIG. 4, if the doors 2*h* and 2*i* are detected to be in an open state (hereinafter, referred to as courtesy SW opened, in other words, the courtesy switch 323 is turned on) by the courtesy switch 323, if the door lock is detected to be in a released state (hereinafter, door lock released, in other words, the door lock position switch 322 is turned on) by the door lock position switch 322, and if the remote operation ECU 303 detects a radio wave from the smart key via the antenna 301 (owner key detected), the theft prevention ECU 310 determines the state of the vehicle 1 as the no-warning state in which the occupant shows the intention of getting on vehicle 1.

In addition, as illustrated in FIG. 4, if the doors 2*h* and 2*i* are detected to be in a closed state (hereinafter, referred to as courtesy SW closed, in other words, the courtesy switch 323 is turned off) by the courtesy switch 323, if the door lock is detected to be in a locked state (hereinafter, door lock locked, in other words, the door lock position switch 322 is turned off) by the door lock position switch 322, if an ignition power of the vehicle 1 is detected to be turned off (hereinafter, referred to as IG-OFF), if the occupant is not recognized by the indoor recognition sensor 309 (no occupant), and if the smart key is detected, the theft prevention ECU 310 determines the state of vehicle 1 as the warning preparation state in which the occupant shows the intention of getting off the vehicle 1.

In addition, as illustrated in FIG. 4, if the courtesy SW closed is detected, if the locked state is detected, if the IG-OFF is detected, and if the remote operation ECU 303 does not detect the radio wave from the smart key (owner key not detected), the theft prevention ECU 310 determines the state of vehicle 1 as the warning state in which the occupant gets off the vehicle 1. In addition, as illustrated in FIG. 4, in the warning state, if the illegal act against the vehicle 1 is detected by the fraud detection sensor or by the indoor recognition sensor 309, the theft prevention ECU 310 transitions the state of the vehicle 1 to the alarm state in which the illegal act against the vehicle 1 is notified by the warning device 311.

In addition, as illustrated in FIG. 4, after the transition to the alarm state, if a time during which the illegal act against the vehicle 1 is not detected by the fraud detection sensor or by the indoor recognition sensor 309 is continued for the predetermined time and the time is out, the theft prevention ECU 310 returns the state of the vehicle 1 to the warning state again. Furthermore, as illustrated in FIG. 4, after the transition to the alarm state, if the courtesy SW opened is detected, the door lock released is detected, and the smart key is detected, the theft prevention ECU 310 transitions the state of the vehicle 1 to the no-warning state. Alternatively, as illustrated in FIG. 4, after the transition to the alarm state, if the door lock is requested to be released by the normal key or if the remote operation ECU 303 receives an alarm release request instructing the release of the alarm state from the external device D, the theft prevention ECU 310 transitions the state of vehicle 1 to the no-warning state.

Figure 5:
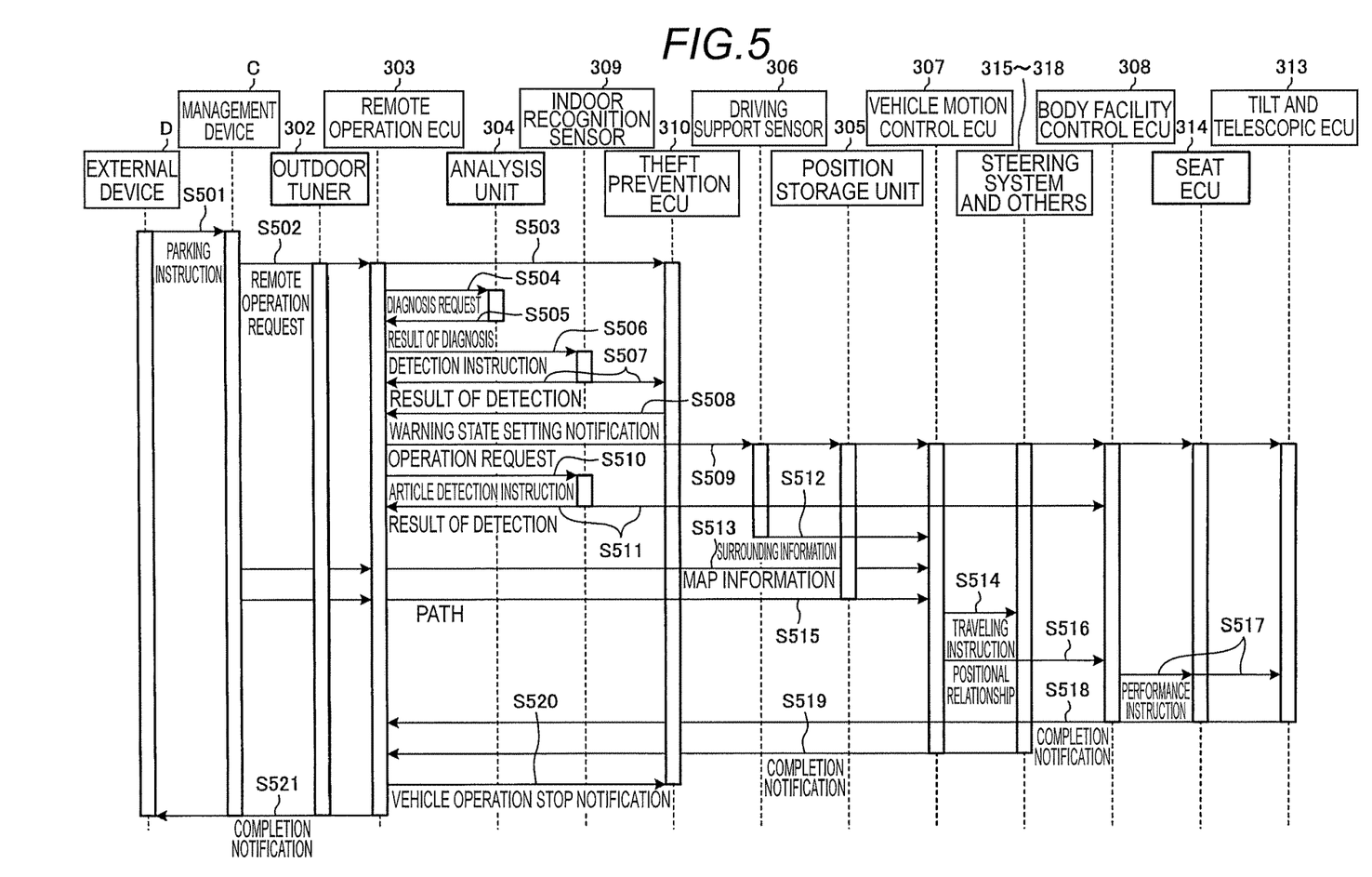
FIG. 5 is a sequence diagram illustrating an example of a flow of parking processing for the vehicle according to the present embodiment.

Next, an example of a flow of the parking processing for the vehicle 1 according to the present embodiment will be described with reference to FIG. 5. FIG. 5 is a sequence diagram illustrating an example of the flow of the parking processing for the vehicle according to the present embodiment.

When a parking instruction is transmitted from the external device D held by the user outside the vehicle 1 to the management device C (STEP S501), after performing a user authentication for the external device D, the management device C creates map information around the vehicle 1 and transmits a remote operation request including the created map information to the vehicle 1 (STEP S502).

When the remote operation request is received from the management device C via the outdoor tuner 302, the remote operation ECU 303 notifies the theft prevention ECU 310 of the fact that the remote operation request is received (STEP S503). When it is notified that the remote operation request is received, the theft prevention ECU 310 confirms that the courtesy switch 323 and the door lock position switch 322 are in the OFF state.

In addition, the remote operation ECU 303 transmits a diagnosis request instructing the analysis unit 304 to perform the diagnosis of the vehicle 1 (STEP S504). When the instruction to perform the diagnosis of the vehicle 1 is issued from the remote operation ECU 303, the analysis unit 304 performs the diagnosis of the vehicle 1 and notifies the remote operation ECU 303 of the result of diagnosis (STEP S505).

If abnormality of the vehicle 1 is detected by the analysis unit 304, the remote operation ECU 303 stops the parking processing for the vehicle 1 and notifies the user of the content of the abnormality. On the other hand, if the abnormality of the vehicle 1 is not detected by the analysis unit 304 and the theft prevention ECU 310 confirms that the courtesy switch 323 and the door lock position switch 322 are in the OFF state, the remote operation ECU 303 transmits a detection instruction to detect the presence or absence of the occupant to the indoor recognition sensor 309 (STEP S506).

When the detection instruction to detect the presence or absence of the occupant is received, the indoor recognition sensor 309 detects the presence or absence of the occupant in the vehicle cabin 2a and transmits the result of detection to the theft prevention ECU 310 and the remote operation ECU 303 (STEP S507). If the indoor recognition sensor 309 detects that the occupant is not present in the vehicle cabin 2a, the theft prevention ECU 310 determines that the occupant gets off the vehicle 1 and transitions the state of the vehicle 1 to the warning state. The theft prevention ECU 310 transmits a warning state setting notification indicating that the state of the vehicle 1 transitions to the warning state, to the remote operation ECU 303 (STEP S508).

When the warning state setting notification is received from the theft prevention ECU 310, the remote operation ECU 303 transmits an operation request instructing to start the operation, to the vehicle motion control ECU 307, the driving support sensor 306, the position storage unit 305, the body facility control ECU 308, the seat ECU 314, and the tilt and telescopic ECU 313 (STEP S509). When the operation request is received from the remote operation ECU 303, the autonomous travel control unit 307a of the vehicle motion control ECU 307 controls the travel device such as the drive train system 315, and performs the parking processing to move the vehicle 1 to the parking position and to park the vehicle 1 at the parking position according to the path generated by the path generation unit 307c.

When the state of the vehicle 1 transitions to the warning state and the autonomous driving control of vehicle 1 is performed, the theft prevention ECU 310 disables the fraud detection sensor 325 or decreases the sensitivity of the fraud detection sensor 325. In this way, when the vehicle 1 is operated according to the remote operation request, the erroneous detection of the illegal act against the vehicle 1 by the fraud detection sensor 325 can be prevented. In this case, the theft prevention ECU 310 may detect the illegal act against the vehicle 1 using a sensor other than the fraud detection sensor 325 (for example, the indoor recognition sensor 309).

When the parking processing for the vehicle 1 is started, the remote operation ECU 303 transmits an article detection instruction to detect the article in the vehicle cabin 2a, to the indoor recognition sensor 309 (STEP S510). When the article detection instruction is received, the indoor recognition sensor 309 detects the articles existing around the body facility (for example, the movement range of the body facility), and transmits the result of detection to the remote operation ECU 303 and the body facility control ECU 308 (STEP S511).

During the parking processing for the vehicle 1, the autonomous travel control unit 307a acquires the surrounding information from the driving support sensor 306 (STEP S512) and performs the parking processing based on the acquired surrounding information such that the vehicle 1 does not collide with the obstacle. In addition, during the parking processing for the vehicle 1, the remote operation ECU 303 acquires map information around the vehicle 1 from the management device C and stores the acquired map information in the position storage unit 305 (STEP S513). The host vehicle position estimation unit 307b of the vehicle motion control ECU 307 re-estimates the host vehicle position in the map indicated by the latest map information stored in the position storage unit 305. The path generation unit 307c of the vehicle motion control ECU 307 re-generates the path of the vehicle 1 from the host vehicle position to the parking position based on the re-estimated host vehicle position and the map indicated by the map information. The autonomous travel control unit 307a outputs a traveling instruction to the travel device such as the drive train system 315, and performs the parking processing according to the re-generated path (STEP S514).

In the present embodiment, the autonomous travel control unit 307a performs the parking processing according to the path generated in the vehicle 1, however, the parking processing may be performed according to the path generated in the external device such as the management device C. Specifically, the host vehicle position estimation unit 307b estimates the host vehicle position of the vehicle 1, and transmits the estimated host vehicle position to the management device C by wireless communication via the remote operation ECU 303. The management device C creates a path from the host vehicle position received from vehicle 1 to the parking position and transmits the created path to the vehicle 1 by wireless communication (STEP S515). In this case, the autonomous travel control unit 307a performs the parking processing according to the path received from the management device C.

When the parking processing is started by the vehicle motion control ECU 307 and it is detected by the indoor recognition sensor 309 that an article is not present around the body facility, the body facility control unit 308a of the body facility control ECU 308 acquires a distance between the external device D held by the user and the vehicle 1 as a positional relationship (STEP S516). In the present embodiment, if the external device D is a smart key, the body facility control unit 308a acquires the distance between the external device D and the vehicle 1 based on the intensity of the radio wave received by the remote operation ECU 303 from the smart key via the antenna 301, the position information of the external device D and the vehicle 1 (position information acquired using global positioning system (GPS)), and the like.

If the acquired distance is equal to or longer than a predetermined distance, the body facility control unit 308a transmits an performance instruction instructing the operation of the body facility to the seat ECU 314 and the tilt and telescopic ECU 313 to perform the second change processing for changing the state of the body facility from the normal state to the theft prevention state (STEP S517). In this way, when parking the vehicle 1 in the parking position by the autonomous driving control, the second change processing is performed after it becomes less possible for the user to return to the vehicle 1. Therefore, if the occupant temporarily wishes to return to the vehicle cabin 2a after the parking instruction is transmitted from the external device D, it is possible to prevent the state of the body facility from being changed to the theft prevention state, and thus, it is possible to prevent the occupant from becoming hard to return to the vehicle cabin 2a.

In the present embodiment, the seat ECU 314 and the tilt and telescopic ECU 313 change the state of the body facility to the theft prevention state set in advance when performing the second change processing, but the present invention is not limited thereto, and the state of the body facility can be changed to the theft prevention state received from the external device D. In addition, in the present embodiment, when the second change processing is performed, the seat ECU 314 and the tilt and telescopic ECU 313 may change the state of the body facility to the theft prevention state set in advance by the user among a plurality of theft prevention state candidates. In addition, in the present embodiment, when the second change processing is performed, the seat ECU 314 makes all the plurality of seats 2b included in the vehicle 1 be in the theft prevention state, but the present invention is not limited thereto, and a part of the seats 2b (for example, the seat selected by the user in advance, the driver's seat and the front passenger's seat) among the plurality of seats 2b may be in the theft prevention state. Furthermore, in the present embodiment, when the second change processing is performed, the seat ECU 314 may make the seat 2b be in the theft prevention state, and then, the actuator for changing the state of the seat 2b be in the locked state (that is, the seat 2b is not moved).

When the second change processing is completed, the seat ECU 314 and the tilt and telescopic ECU 313 transmit a completion notification notifying of the completion of the second change processing to the theft prevention ECU 310 and the remote operation ECU 303 (STEP S518). In addition, when the parking processing is completed, the travel device such as the drive train system 316 transmits a completion notification notifying of the completion of the parking processing to the vehicle motion control ECU 307, the theft prevention ECU 310, and the remote operation ECU 303 (STEP S519).

When the completion notification notifying of the completion of the second change processing is received from the seat ECU 314 and the tilt and telescopic ECU 313 and when the completion notification notifying of the completion of the parking processing is received from the drive train system 316 or the like, the remote operation ECU 303 transmits a vehicle operation stop notification indicating that the ignition power of the vehicle 1 is turned off, to the theft prevention ECU 310 (STEP S520). When the vehicle operation stop notification is received, the theft prevention ECU 310 determines the state of the vehicle 1 as a warning state. In addition, after the vehicle operation stop notification is transmitted to the theft prevention ECU 310, the remote operation ECU 303 transmits a completion notification notifying of the completion of the parking processing, to the external device D via the outdoor tuner 302 (STEP S521).

Figure 6:
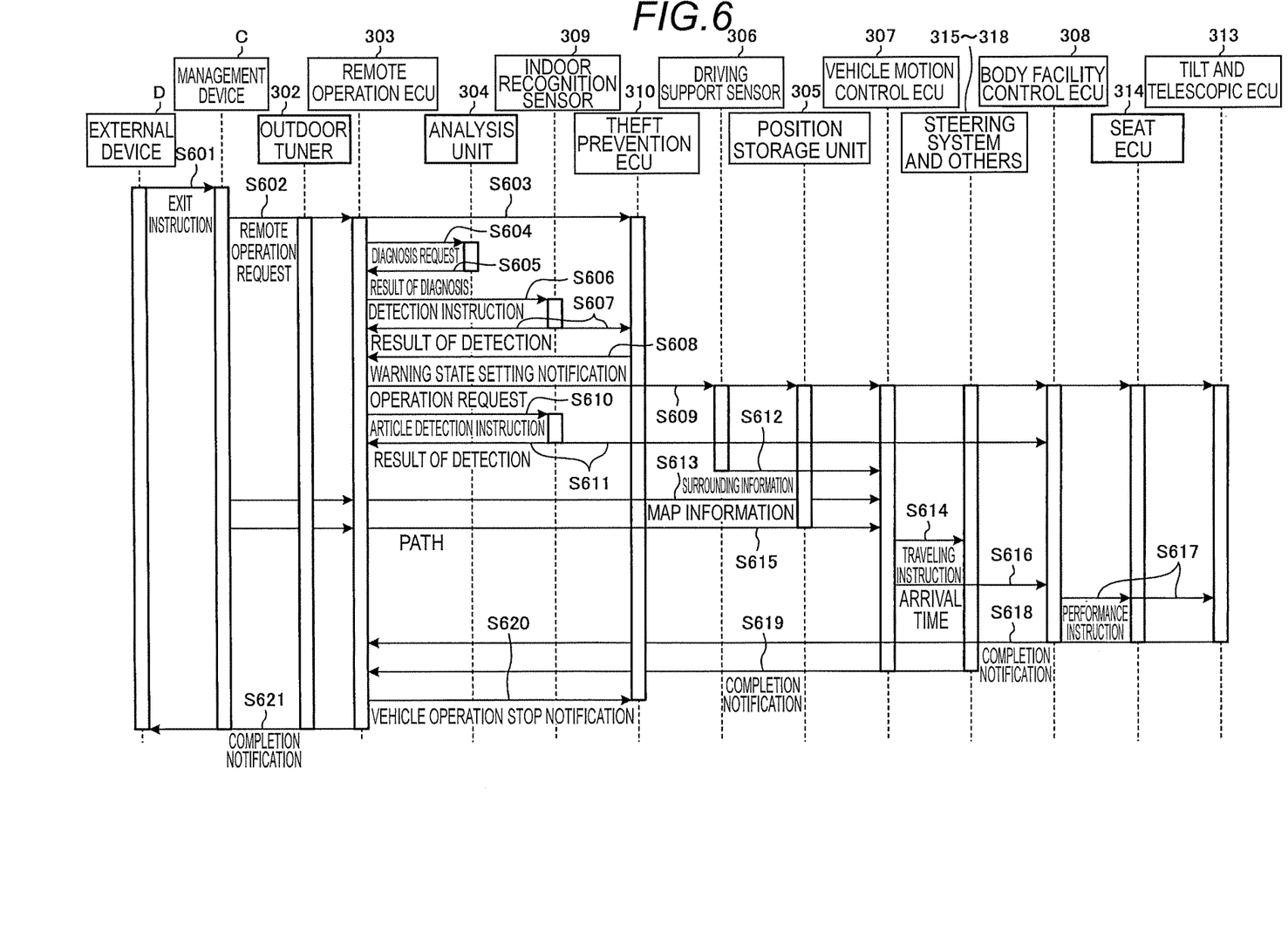
FIG. 6 is a sequence diagram illustrating an example of a flow of exit processing for the vehicle according to the present embodiment.

Next, an example of a flow of the exit processing for the vehicle 1 according to the present embodiment will be described with reference to FIG. 6. FIG. 6 is a sequence diagram illustrating an example of a flow of the exit processing for the vehicle according to the present embodiment.

When an exit instruction is transmitted from the external device D held by the user outside the vehicle 1 to the management device C (STEP S601), after performing a user authentication for the external device D, the management device C creates map information around the vehicle 1 and transmits a remote operation request including the created map information to the vehicle 1 (STEP S602).

When the remote operation request is received from the management device C via the outdoor tuner 302, the remote operation ECU 303 notifies the theft prevention ECU 310 of the fact that the remote operation request is received (STEP S603). When it is notified that the remote operation request is received, the theft prevention ECU 310 confirms that the courtesy switch 323 and the door lock position switch 322 are in the OFF state.

In addition, the remote operation ECU 303 transmits a diagnosis request instructing the analysis unit 304 to perform the diagnosis of the vehicle 1 (STEP S604). When the instruction to perform the diagnosis of the vehicle 1 is issued from the remote operation ECU 303, the analysis unit 304 performs the diagnosis of the vehicle 1 and notifies the remote operation ECU 303 of the result of diagnosis (STEP S605).

If the abnormality of the vehicle 1 is detected by the analysis unit 304, the remote operation ECU 303 stops the exit processing for the vehicle 1 and notifies the user of the content of the abnormality. On the other hand, if the abnormality of the vehicle 1 is not detected by the analysis unit 304 and the theft prevention ECU 310 confirms that the courtesy switch 323 and the door lock position switch 322 are in the OFF state, the remote operation ECU 303 transmits a detection instruction to detect the presence or absence of the occupant to the indoor recognition sensor 309 (STEP S606).

When the detection instruction to detect the presence or absence of the occupant is received, the indoor recognition sensor 309 detects the presence or absence of the occupant in the vehicle cabin 2a and transmits the result of detection to the theft prevention ECU 310 and the remote operation ECU 303 (STEP S607). If the indoor recognition sensor 309 detects that the occupant is not present in the vehicle cabin 2a, the theft prevention ECU 310 determines that the occupant gets off the vehicle 1 and transitions the state of the vehicle 1 to the warning state. The theft prevention ECU 310 transmits a warning state setting notification indicating that the state of the vehicle 1 transitions to the warning state, to the remote operation ECU 303 (STEP S608).

When the warning state setting notification is received from the theft prevention ECU 310, the remote operation ECU 303 transmits an operation request instructing to start the operation, to the vehicle motion control ECU 307, the driving support sensor 306, the position storage unit 305, the body facility control ECU 308, the seat ECU 314, and the tilt and telescopic ECU 313 (STEP S609). When the operation request is received from the remote operation ECU 303, the autonomous travel control unit 307a of the vehicle motion control ECU 307 controls the travel device such as the drive train system 315, and performs the exit processing to move the vehicle 1 from the parking position and to move the vehicle 1 to the user position according to the path generated by the path generation unit 307c.

When the state of the vehicle 1 transitions to the warning state and the autonomous driving control of vehicle 1 is performed, the theft prevention ECU 310 disables the fraud detection sensor 325 or decreases the sensitivity of the fraud detection sensor 325. In this way, when the vehicle 1 is operated according to the remote operation request, the erroneous detection of the illegal act against the vehicle 1 by the fraud detection sensor 325 can be prevented. In this case, the theft prevention ECU 310 may detect the illegal act against the vehicle 1 using a sensor other than the fraud detection sensor 325 (for example, the indoor recognition sensor 309).

When the exit processing for the vehicle 1 is started, the remote operation ECU 303 transmits an article detection instruction for instructing to detect the article in the vehicle cabin 2a, to the indoor recognition sensor 309 (STEP S610). When the article detection instruction is received, the indoor recognition sensor 309 detects the articles existing around the body facility (for example, the movement range of the body facility), and transmits the result of detection to the remote operation ECU 303 and the body facility control ECU 308 (STEP S611).

During the exit processing for the vehicle 1, the autonomous travel control unit 307a acquires the surrounding information from the driving support sensor 306 (STEP S612) and performs the exit processing based on the acquired surrounding information such that the vehicle 1 does not collide with the obstacle. In addition, during the exit processing for the vehicle 1, the remote operation ECU 303 acquires map information around the vehicle 1 from the management device C and stores the acquired map information in the position storage unit 305 (STEP S613). The host vehicle position estimation unit 307b of the vehicle motion control ECU 307 re-estimates the host vehicle position in the map indicated by the map information stored in the position storage unit 305. The path generation unit 307c re-generates the path of the vehicle 1 from the host vehicle position to the user position based on the re-estimated host vehicle position and the map indicated by the map information. The autonomous travel control unit 307a outputs a traveling instruction to the travel device such as the drive train system 316, and performs the exit processing according to the re-generated path (STEP S614).

In the present embodiment, the autonomous travel control unit 307a performs the exit processing according to the path generated in the vehicle 1, however, the exit processing may be performed according to the path generated in the external device such as the management device C. Specifically, the host vehicle position estimation unit 307b estimates the host vehicle position of the vehicle 1, and transmits the estimated host vehicle position to the management device C by wireless communication via the remote operation ECU 303. The management device C creates a path from the host vehicle position received from vehicle 1 to the user position and transmits the created path to the vehicle 1 by wireless communication (STEP S615). In this case, the autonomous travel control unit 307a performs the exit processing according to the path received from the management device C.

When the exit processing is started by the vehicle motion control ECU 307 and it is detected by the indoor recognition sensor 309 that an article is not present around the body facility, the body facility control unit 308a acquires an arrival time calculated by the path generation unit 307c (STEP S616).

At a time backward from the arrival time by a predetermined time, the body facility control unit 308a transmits a performance instruction instructing the operation of the body facility to the seat ECU 314 and the tilt and telescopic ECU 313 to perform the first change processing for changing the state of the body facility from the theft prevention state to the normal state (STEP S617). In this way, when getting out the vehicle 1 from the parking position and moving the vehicle 1 to the user position by the autonomous driving control, since the time during which the body facility is in the normal state can be shortened, it is possible to reduce the possibility that the vehicle 1 and the devices in the vehicle cabin 2a may be stolen by the illegal act against the vehicle 1 during a time the vehicle 1 arrives at the user position from the parking position.

In the present embodiment, the seat ECU 314 and the tilt and telescopic ECU 313 change the state of the body facility to the normal state set in advance when performing the first change processing, but the present invention is not limited thereto, and the state of the body facility can be changed to the normal state received from the external device D. In addition, in the present embodiment, when the first change processing is performed, the seat ECU 314 and the tilt and telescopic ECU 313 may change the state of the body facility to the normal state set in advance by the user among a plurality of normal state candidates.

When the first change processing is completed, the seat ECU 314 and the tilt and telescopic ECU 313 transmit a completion notification notifying of the completion of the first change processing to the theft prevention ECU 310 and the remote operation ECU 303 (STEP S618). In addition, when the exit processing is completed, the travel device such as the drive train system 316 transmits a completion notification notifying of the completion of the exit processing to the vehicle motion control ECU 307, the theft prevention ECU 310, and the remote operation ECU 303 (STEP S619).

When the completion notification notifying of the completion of the first change processing is received from the seat ECU 314 and the tilt and telescopic ECU 313 and when the completion notification notifying of the completion of the exit processing is received from the travel device such as the drive train system 316, the remote operation ECU 303 transmits a vehicle operation stop notification indicating that the ignition power of the vehicle 1 is turned off, to the theft prevention ECU 310 (STEP S620). When the vehicle operation stop notification is received, the theft prevention ECU 310 determines the state of the vehicle 1 as a warning state. In addition, after the vehicle operation stop notification is transmitted to the theft prevention ECU 310, the remote operation ECU 303 transmits a completion notification notifying of the completion of the exit processing, to the external device D via the outdoor tuner 302 (STEP S621).

Figure 7:
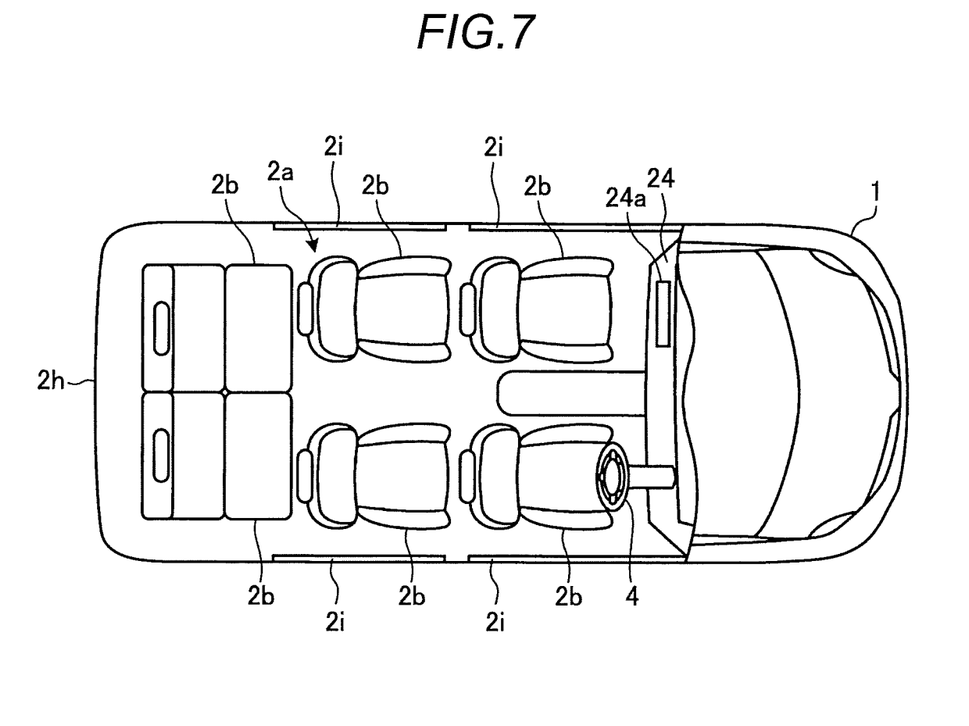
FIG. 7 is an example of a diagram of body facilities in a normal state of the vehicle viewed from above according to the present embodiment.
Figure 8:
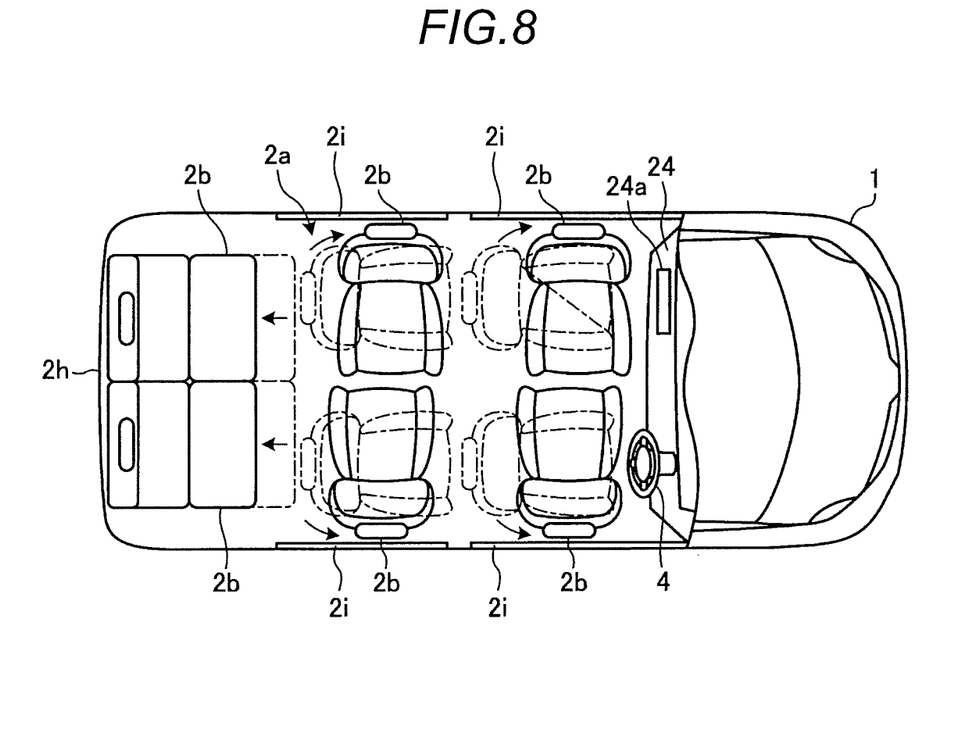
FIG. 8 is an example of a diagram of body facilities in a theft prevention state of the vehicle viewed from above according to the present embodiment.
Figure 9:
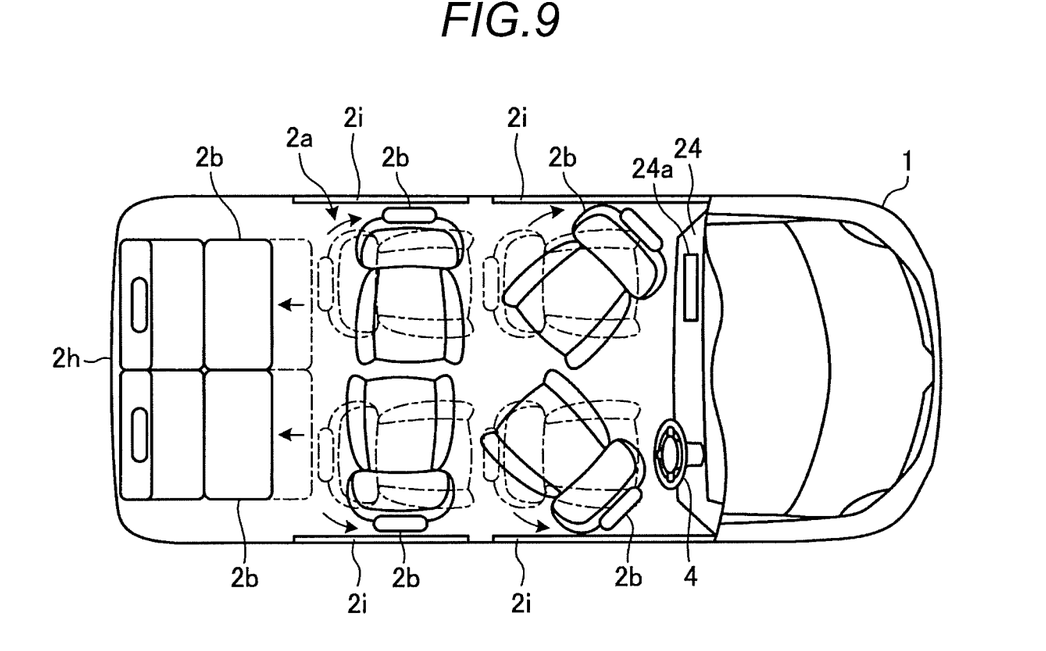
FIG. 9 is an example of a diagram of the body facilities in the theft prevention state of the vehicle as viewed from above according to the present embodiment.
Figure 10:
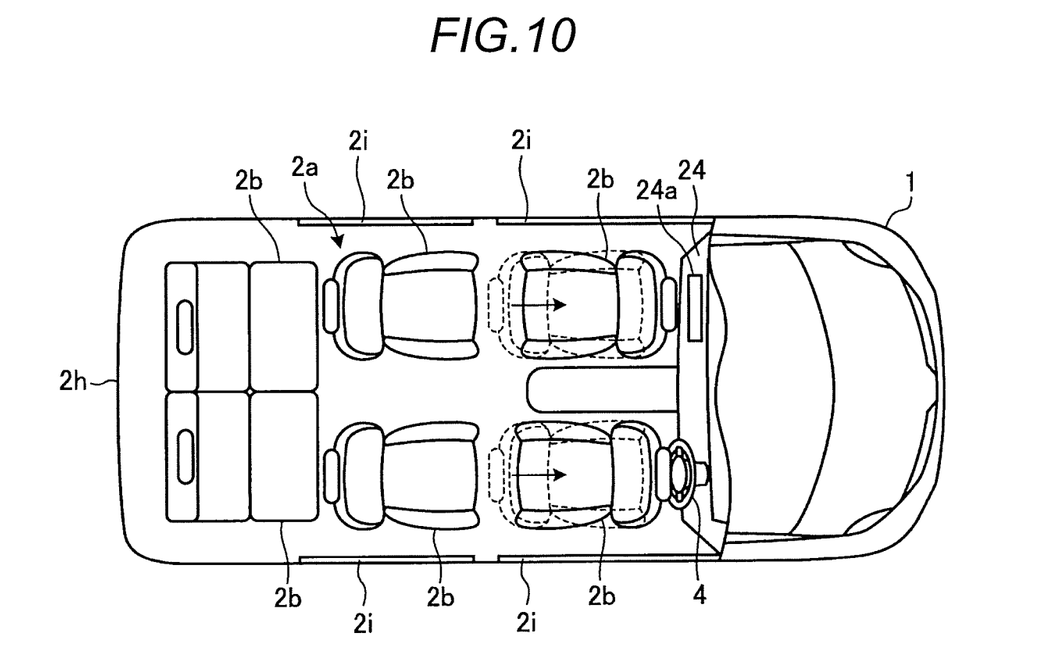
FIG. 10 is an example of a diagram of the body facilities in the theft prevention state of the vehicle viewed from above according to the present embodiment.

FIG. 7 is an example of a diagram of the body facilities in the normal state of the vehicle viewed from above according to the present embodiment. FIG. 8 to FIG. 10 are examples of diagrams of the body facilities in the theft prevention state of the vehicle viewed from above according to the present embodiment. In the present embodiment, when changing the state of the seat 2b which is an example of the body facility to the theft prevention state, as illustrated in FIG. 7 and FIG. 8, the body facility control unit 308a changes the state of the seat 2b to a state it is difficult to enter the vehicle cabin 2a and to steal the article in the vehicle cabin 2a. Specifically, as illustrated in FIG. 7 and FIG. 8, the body facility control unit 308a changes the state of a back surface of the backrest of the seat 2b to the theft prevention state facing the doors 2h and 2i in the vicinity of the seat 2b among the doors 2h and 2i of the vehicle 1. As a result, even if the doors 2h and 2i of the vehicle 1 are opened, since it is difficult to enter the vehicle cabin 2a due to the backrest of the seat 2b, it is possible to prevent the theft of the vehicle 1 and the articles in the vehicle cabin 2a from occurring.

In addition, as illustrated in FIG. 7 and FIG. 8, even in the normal state such as the seat 2b (rear seat) in the vicinity of the rear hatch door 2h among the seat 2b in the vehicle cabin 2a, when the back surface of the backrest of the rear seat is in the state of facing the door 2h, the body facility control unit 308a may set the theft prevention state as a state in which the position of the rear seat in the front-rear direction is moved to backward to be close to the door 2h. In this way, when the door 2h is opened, since it is difficult to enter the vehicle cabin 2a from the door 2h, it is possible to prevent the theft of the vehicle 1 and the articles in the vehicle cabin 2a from occurring. In addition, if a storage section is provided in the backside of the rear seat and under the floor of the vehicle 1, the body facility control unit 308a may set the theft prevention state as a state in which the rear seat is moved backward such that the lid portion of the storage section cannot be opened.

In addition, as illustrated in FIG. 10, the body facility control unit 308a may set the theft prevention state as a state in which the driver's seat and the front passenger's seat of the seat 2b among the seats 2b in the vehicle cabin 2a are moved ahead than that in the normal state. That is, the body facility control unit 308a may set the theft prevention state as a state in which at least one of the position of the seat 2b in the front-rear direction and the position of the backrest of the seat 2b is moved to a position where it is difficult to drive the vehicle 1 and to open the storage section in the vehicle cabin 2a. In this way, the seat 2b can be moved to a position where it is difficult to operate the steering section 4, the acceleration operation section 5, the braking operation section 6, and the like, to open and close a glove box 24a provided on the dashboard 24, and to access the diagnostic port or the display device 8 provided at the bottom of the dashboard 24. Therefore, it is possible to prevent the theft of the vehicle 1 and the articles in the vehicle cabin 2a from occurring. At this time, as illustrated in FIG. 10, the body facility control unit 308a may rotate the driver's seat and the front passenger's seat by 180 degrees (in other words, the backrest of the driver's seat and the front passenger's seat are turned toward the dashboard 24).

In addition, if the seat 2b is a seat of which a seating surface can be opened and closed in the vertical direction, and the articles can be stored under the seat surface, the body facility control unit 308a may set the theft prevention state as a state in which the backrest of the seat 2b cannot be opened by tilting the backrest to the front direction (in other words, to the seat surface side). In this way, even if somebody enters the vehicle cabin 2a, it is difficult to open the seat surface of the seat 2b. Therefore, it is possible to prevent the theft of the articles in the vehicle cabin 2a from occurring. In addition, for example, if a storage is provided behind the seat 2b such case as in a two-seater car, the body facility control unit 308a may set the theft prevention state as a state it is difficult to access the storage provided behind the seat 2b by tilting the backrest of the seat 2b backward.

In addition, in the present embodiment, as illustrated in FIG. 7 and FIG. 8, the body facility control unit 308a sets the theft prevention state as a state in which the seat 2b in the vehicle cabin 2a is rotated by 90 degrees from the normal state and the back surface of the backrest is facing the door 2i, however, any state may be set as the theft prevention state as long as the seat 2b is moved to a state in which entering the vehicle cabin 2a and to steal the articles in the vehicle cabin 2a. Specifically, as illustrated in FIG. 9, the body facility control unit 308a may set the theft prevention state as a state in which the driver's seat and the front passenger's seat of a plurality of seats 2b are obliquely inclined with respect to the traveling direction of vehicle 1, and the back surface of the backrest of the driver's seat and the front passenger's seat is facing the door 2i and the dashboard 24 (steering section 4).

For example, as illustrated in FIG. 9, the body facility control unit 308a may set the theft prevention state as a state in which the driver's seat of the seat 2b is rotated counter-clockwise by 135 degrees from the normal state and the front passenger's seat is rotated clockwise by 135 degrees from the normal state. In this way, the state in which the back surface of the backrest of the seat 2b can face the door 2i and the back surface of the backrest of the seat 2b can be close to the steering section 4 and the dashboard 24 can be set as the theft prevention state, and thus, it is difficult to access the glove box 24a provided on the dashboard 24 while making it difficult to enter the vehicle cabin 2a. Therefore, it is possible to prevent the theft of the vehicle 1 and the articles in the vehicle cabin 2a from occurring.

Furthermore, in addition to the state of the seat 2b, the body facility control unit 308a may set the theft prevention state as a state in which the state of the steering section 4 is changed to a state of making the driving of the vehicle 1 be difficult. For example, the body facility control unit 308a sets the theft prevention state as a state in which the steering section 4 is moved forward from that in the normal state, the steering section 4 is reversed and the steering section 4 is stored in the dashboard 24, or the steering section 4 is reversed and is disposed the display device instead of the steering section 4. In this way, it becomes difficult to operate the steering section 4 of the vehicle 1. Therefore, it is possible to prevent the theft of the vehicle 1 from occurring. In addition, the body facility control unit 308a may set the theft prevention state as a state it is difficult to steal the display device 8 by storing the display device 8 in the dashboard 24, and the like.

As described above, according to the vehicle theft prevention device in the present embodiment, when getting out the vehicle 1 from the parking position and moving the vehicle 1 to the user position by the autonomous driving control, a time during which the body facility is the normal state can be shortened. Therefore, it is possible to reduce the possibility that the vehicle 1 and the articles in the vehicle cabin 2a may be stolen by an illegal act against the vehicle 1 during a time the vehicle 1 arrives at the user position from the parking position, and the user can get on the vehicle 1 smoothly.

A vehicle theft prevention device in an embodiment includes a device control unit as an example. The device control unit starts, when performing exit processing for causing a vehicle to move from a parking position to a user position by an autonomous driving control of the vehicle in response to an exit instruction to the vehicle from a terminal of the user outside the vehicle, performing first change processing for changing a state of facilities in a vehicle cabin of the vehicle from a theft prevention state in which theft of the vehicle and articles in the vehicle cabin is prevented to a normal state in which the vehicle can be driven by the user ends such that the first change processing when the vehicle arrives at the user position. Accordingly, the vehicle theft prevention device in the present embodiment can reduce a possibility that a vehicle and articles in the vehicle cabin may be stolen by an illegal act against the vehicle during a time the vehicle arrives at a user position from a parking position, and the user can get on the vehicle smoothly.

In addition, in the vehicle theft prevention device in the embodiment, as an example, when performing parking processing for causing the vehicle to park in the parking position by the autonomous driving control of the vehicle in response to a parking instruction to the vehicle from the terminal of the user outside the vehicle, the device control unit further starts performing second change processing for changing the state from the normal state to the theft prevention state after the vehicle is separated from the terminal by a predetermined distance or more. Accordingly, in the vehicle theft prevention device in the present embodiment, when the occupant temporarily returns to the vehicle to take a forgotten object or the like in the vehicle cabin after the parking instruction is transmitted from the terminal of the user, it is possible to prevent the situation in which it is difficult for the user to return to the vehicle cabin due to the state of the facilities being changed to the theft prevention state.

In addition, in the vehicle theft prevention device in the embodiment, as an example, the facility includes a seat of the vehicle. The theft prevention state is a state in which a state of the seat is changed to a state in which it is difficult to enter the vehicle cabin and to steal the vehicle and the articles in the vehicle cabin. Accordingly, in the vehicle theft prevention device in the present embodiment, since it is difficult to enter the vehicle cabin, it is possible to prevent the theft of the vehicle and the articles in the vehicle cabin from occurring.

In addition, in the vehicle theft prevention device in the embodiment, as an example, the theft prevention state is a state in which a back surface of a backrest of the seat faces a door in a vicinity of the seat among doors of the vehicle. Accordingly, in the vehicle theft prevention device in the present embodiment, even when the door of the vehicle is opened, since it is difficult to enter the vehicle cabin due to the backrest of the seat, it is possible to prevent the theft of the vehicle and the articles in the vehicle cabin from occurring.

In addition, in the vehicle theft prevention device in the embodiment, as an example, the theft prevention state is a state in which at least one of a position of the seat in a front-rear direction and a position of the backrest of the seat is moved to a state in which it is difficult to open a storage section provided in the vehicle cabin or to a state in which it is difficult to drive the vehicle. Accordingly, in the vehicle theft prevention device in the present embodiment, since the seat can be moved to a position where it is difficult to operate the steering section, the acceleration operation section, the braking operation section, and the like, and to open and close a glove box provided on the dashboard, it is possible to prevent the theft of the vehicle and the articles in the vehicle cabin from occurring.

In addition, in the vehicle theft prevention device in the embodiment, as an example, a seat surface of the seat is able to be opened and closed in a vertical direction and the articles is able to be stored under the seat surface. The theft prevention state is a state in which the backrest of the seat is reclined to the seat surface side and the seat surface is not able to be opened. Accordingly, in the vehicle theft prevention device in the present embodiment, even if somebody enters the vehicle cabin, since it is difficult to open the seat surface of the seat, it is possible to prevent the theft of the articles in the vehicle cabin from occurring.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:
1. A vehicle theft prevention device comprising:
 a device control unit that starts, when performing exit processing for causing a vehicle to move from a parking position to a user position by an autonomous driving control of the vehicle in response to an exit instruction to the vehicle from a terminal of the user outside the vehicle, performing first change processing for changing a state of facilities in a vehicle cabin of the vehicle from a theft prevention state in which theft of the vehicle and articles in the vehicle cabin is prevented to a normal state in which the vehicle is able to be driven by the user such that the first change processing ends when the vehicle arrives at the user position,
 wherein the facility includes a seat of the vehicle,
 wherein the theft prevention state is a state in which a state of the seat is changed to a state in which it is difficult to enter the vehicle cabin and to steal the vehicle and the articles in the vehicle cabin,
 wherein the theft prevention state is a state in which a back surface of a backrest of the seat faces a door in a vicinity of the seat among doors of the vehicle, and
 wherein the theft prevention state is a state in which the back surface of the backrest of the seat faces a side door near the seat, or a position of a rear seat in a front-rear direction is moved to be backward to bring the back surface of the backrest of the rear seat to be closer to a back door.

2. The vehicle theft prevention device according to claim 1,
wherein when performing parking processing for causing the vehicle to park in the parking position by the autonomous driving control of the vehicle in response to a parking instruction to the vehicle from the terminal of the user outside the vehicle, the device control unit further starts performing second change processing for changing the state from the normal state to the theft prevention state after the vehicle is separated from the terminal by a predetermined distance or more.

3. A vehicle theft prevention device comprising:
a device control unit that starts, when performing exit processing for causing a vehicle to move from a parking position to a user position by an autonomous driving control of the vehicle in response to an exit instruction to the vehicle from a terminal of the user outside the vehicle, performing first change processing for changing a state of facilities in a vehicle cabin of the vehicle from a theft prevention state in which theft of the vehicle and articles in the vehicle cabin is prevented to a normal state in which the vehicle is able to be driven by the user such that the first change processing ends when the vehicle arrives at the user position,
wherein the facility includes a seat of the vehicle,
wherein the theft prevention state is a state in which a state of the seat is changed to a state in which it is difficult to enter the vehicle cabin and to steal the vehicle and the articles in the vehicle cabin,
wherein the theft prevention state is a state in which at least one of a position of the seat in a front-rear direction and a position of a backrest of the seat is moved to a state in which it is difficult to open a storage section provided in the vehicle cabin or to a state in which it is difficult to drive the vehicle, and
wherein the theft prevention state is a state in which back surfaces of the backrest of a driver's seat and of a front passenger's seat faces a dashboard and a steering section, or back surfaces of the backrest of the driver's seat and of the front passenger's seat faces a side door and the dashboard or the steering section.

4. The vehicle theft prevention device according to claim 3,
wherein when performing parking processing for causing the vehicle to park in the parking position by the autonomous driving control of the vehicle in response to a parking instruction to the vehicle from the terminal of the user outside the vehicle, the device control unit further starts performing second change processing for changing the state from the normal state to the theft prevention state after the vehicle is separated from the terminal by a predetermined distance or more.

* * * * *